Sept. 5, 1944. W. F. THOMPSON ET AL 2,357,784
COMBINATION HAND TRUCK AND LIFT
Filed Aug. 14, 1943 2 Sheets-Sheet 1
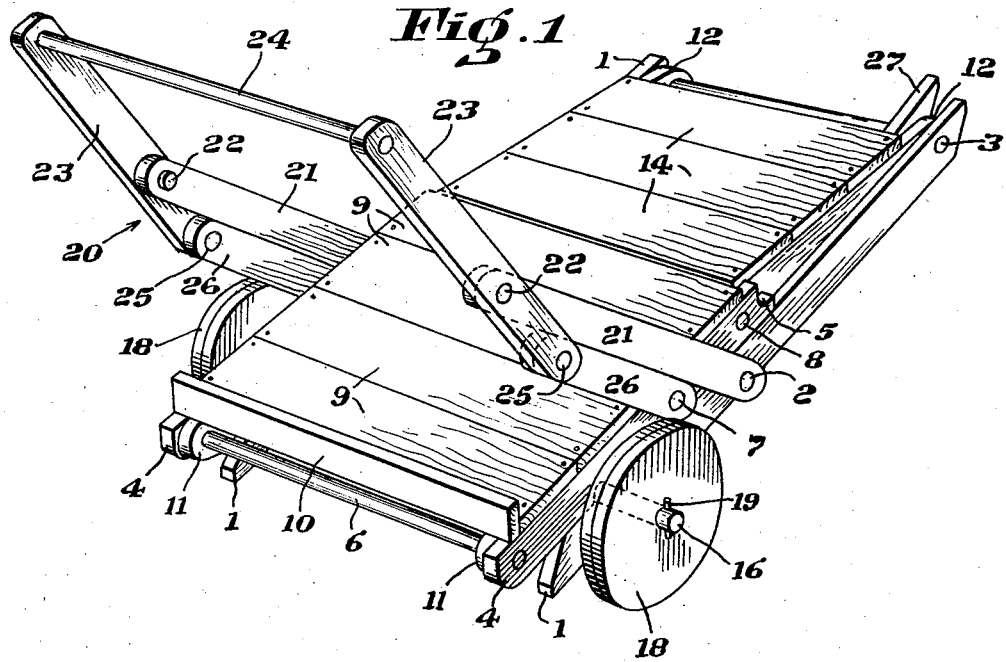
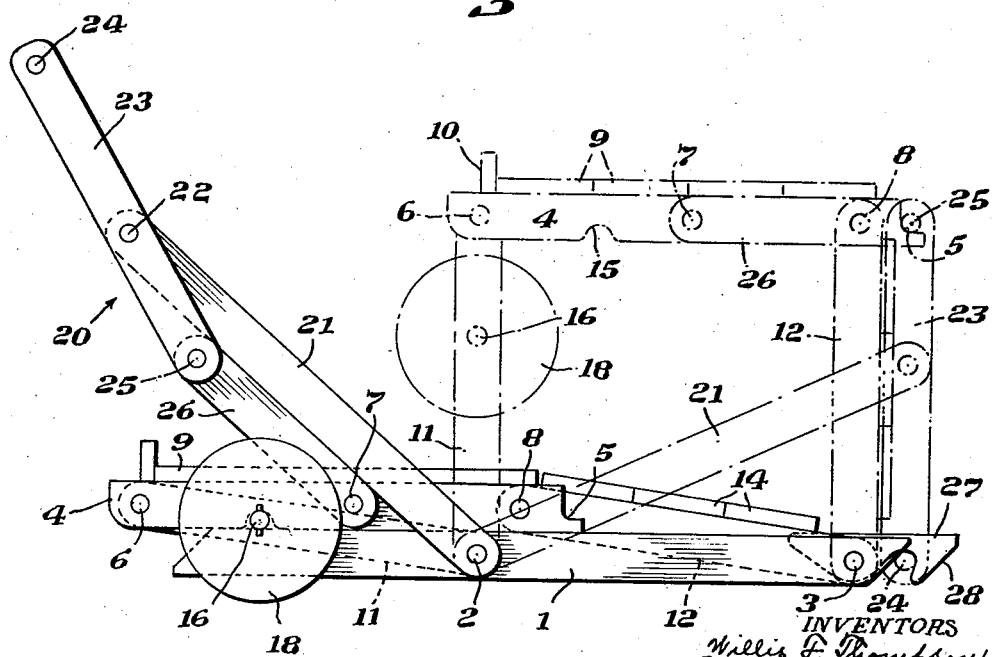

Sept. 5, 1944.　　　W. F. THOMPSON ET AL　　　2,357,784
COMBINATION HAND TRUCK AND LIFT
Filed Aug. 14, 1943　　　2 Sheets-Sheet 2
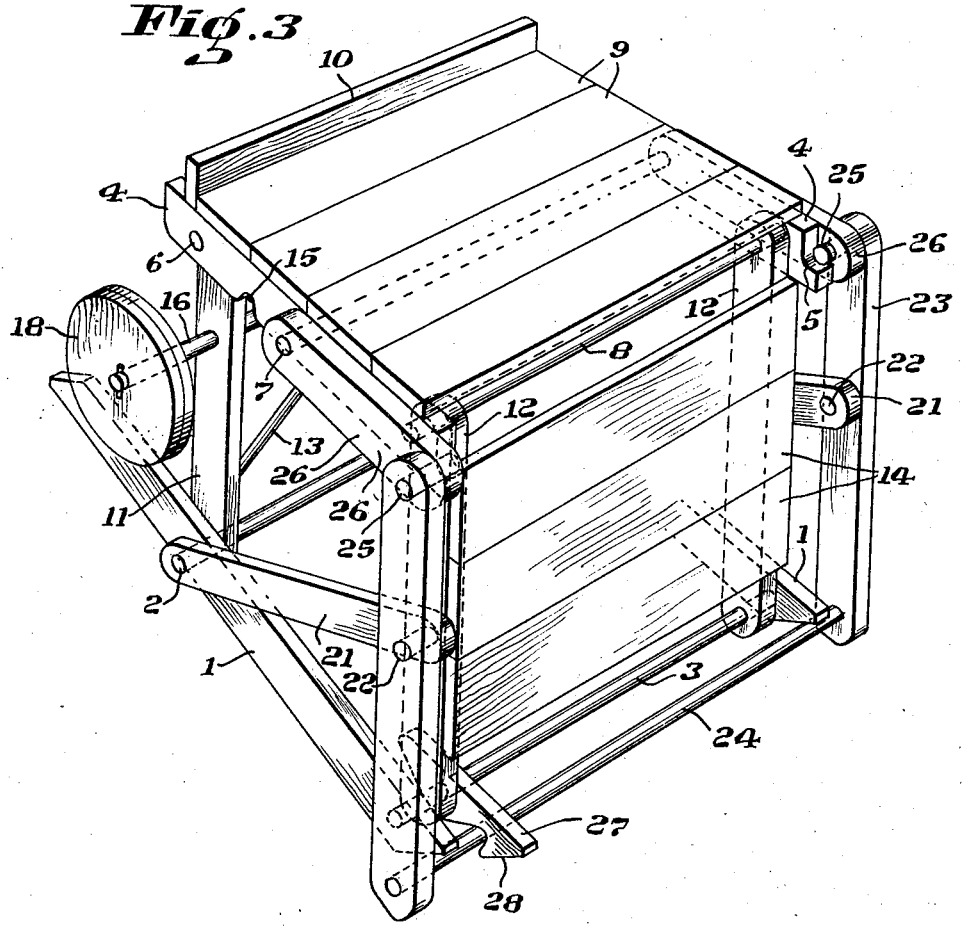
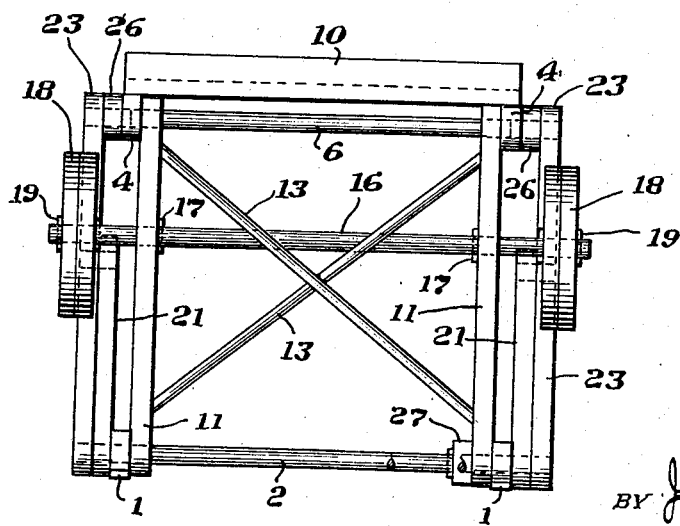
INVENTORS
Willis F. Thompson
Thomas P. Callahan
BY John E. R. Hayes
ATTORNEY Patented Sept. 5, 1944

2,357,784

UNITED STATES PATENT OFFICE 2,357,784

COMBINATION HAND TRUCK AND LIFT

Willis F. Thompson, Portland, Maine, and Thomas P. Callahan, Woburn, Mass., assignors to The Alden Speare's Sons Co., Cambridge, Mass., a corporation of Massachusetts Application August 14, 1943, Serial No. 498,690

9 Claims. (Cl. 254—2)

The invention relates to a combination hand truck and lift, or one in which heavy objects may either be transported, or lifted to occupy an elevated position.

The object of the invention is to provide a device as simple as possible in its construction, but one which will possess all advantages naturally inherent to such a structure.

Especially is it our object to provide a structure in which that which serves as the handle of the truck will serve also, in point of function when manually turned, to effect the lift.

A further object is to provide a structure in which the wheels of the truck will be lifted to occupy an out of the way inoperative position when the truck has been converted into its form of lift.

The invention can best be seen and understood by reference to the drawings in which—

Fig. 1 shows the device in perspective when its parts are in their normal unconverted position combining to form the truck.

Fig. 2 is a side elevation showing in full lines the device as shown in Fig. 1, and in broken lines the device when converted into its form of lift.

Fig. 3 shows a perspective of the device when in its converted form of lift; and Fig. 4 is a front elevation of the device as shown in Fig. 3.

Referring to the drawings:

The base comprises a set of relatively elongated base bars 1, 1 connected and held in spaced relationship to one another by cross rods 2 and 3, respectively. The cross rod 2 extends through the base bars to project beyond the sides thereof. Both cross bars are fixed to the base bars in any suitable manner.

Mounted upon the base is an elevatable structure composed of a series of pivotally connected bars and cross rods connecting these bars. Of these there is a set of bars 4, 4, respectively, which, in their normal position, rest directly upon the base bars in vertical plane therewith. Both have a slight projection beyond the rear ends of the base bars, and with forward extension to a point a little beyond the middle of the base bars; the fore ends of the bars each being incised to provide a socket 5, for purpose later to be referred to. The bars 4, 4 are connected and held in spaced relationship to one another by cross rods 6, 7, and 8, respectively. Of these the cross rods 6 and 8 are arranged, respectively, adjacent the ends of the bars 4, 4, while the cross rod 7 occupies a substantially midway position. All the connecting cross rods are fixed to the bars 4, 4 in any suitable manner. The intermediate cross rod 7 extends through the bars 4, 4 to project beyond the sides thereof.

Laid over and affixed to the tops of the bars 4, 4 are boards 9, which, together with the bars to which they are affixed, combine to form a horizontal support, or rest, upon which is placed the object, not shown, which is transported and lifted. The boarded top of the rest is preferably provided at its rear edge with a raised flange, or stop, 10 also affixed to the bars 4, 4.

The bars 4, 4 are pivotally connected to the base bars 1, 1 by sets of bars 11, 11 and 12, 12, respectively. These bars are all of the same length. At their rear ends the bars 11, 11 are pivoted to turn upon the cross rod 6 adjacent the inner sides of the bars 4, 4; and at their forward ends upon the cross rod 2 of the pair adjacent the inner sides of the respective base bars. The bars 11, 11 are preferably further connected and reinforced by diagonally arranged rods 13. The bars 12, 12 are pivoted at their rear ends to turn upon the cross rod 8 adjacent the inner sides of the bars 4, 4; and at their forward ends to the cross rod 3 adjacent the inner sides of the respective base bars.

Thus arranged the sets of bars 12, 12 will occupy a forwardly inclined position from the fore ends of the bars 4, 4 and rest. Laid over and affixed to the top of the bars 12, 12 are boards 14 forming an incline leading to the boarded top of the rest, and over which the object to be transported and lifted may be moved onto the rest.

Extending through the respective sets of bars 11, 11 and through slots 15 cut in the bottom edges of the bars 4, 4 is an axle 16 held against endwise displacement by flange forming pins 17. The axle has projection well beyond the outer sides of the bars 11, 11 through which it is projecting, and arranged upon the outer ends of the axle are wheels 18 retained by dowels 19. The diameter of the wheels is such that when the wheels are resting upon the floor, or ground, the fore end portion of the base will be raised off the floor, or ground. The extension of the axle through the bars 11, 11 is preferably at points lying rearwardly of the center of gravity of an object placed upon the rest. In consequence the wheels will support the object, but the weight of the object will tend to overbalance, or tip, that portion of the base, and connecting parts, lying forward of the axle so that the fore end of the base will normally tend to engage the floor, or ground, until raised by the handle, to which reference will now be made.

20 represents an assemblage of connecting and connected parts forming the handle, both for moving the device when functioning as a truck, as shown in the full lines of Fig. 2, and for raising the rest and object upon it when the device is functioning as a lift, for the handle is capable of being turned or swung through a considerable arc of movement, when it will operate to lift the rest and object upon it into an elevated position, and will assist in maintaining the rest in such elevated position, all as shown in the broken lines of Fig. 2.

The handle 20 is composed in part of a set of arms 21, 21. These arms are pivotally hung to turn at their bottom fore ends on the outwardly projecting ends of the cross bar 2 of the base. Pivotally hung by connecting pins 22 upon the top rear ends of the arms 21, 21 on the outer sides thereof, is a set of arms 23, 23. At their top rear ends the arms 23, 23 are connected by a cross bar 24 fixedly secured to them. This cross bar serves as a hand grip to the handle. At their bottom fore ends the arms 23, 23 are pivotally connected by pins 25 to a set of links 26, 26 which pivotally connect, respectively, with the outer projecting ends of the cross rod 7 of the rest. The links 26, 26 pivotally connect with the arms 23, 23 on the inner sides of these arms and accordingly lie in plane with the arms 21, 21, and when the device is in its unconverted truck form, as shown in the full lines of Fig. 2, with the bars 4, 4 resting upon the base bars 1, 1, then the sets of arms 21, 21; 26, 26 will lie parallelly disposed with the arms 21, 21 resting upon the arms 26, 26, thus defining the normal inclined position of the handle, and maintaining such position while the device is functioning as a truck for purpose of transportation.

The general operation is as follows: It will be assumed that a weighty object has been placed upon the platform, or rest, of the device. At such time, as previously explained, the weight of the object will tend to hold down the fore end of the device in engagement with the floor, or ground, inasmuch as the wheels are hung on an axis lying back of the center of gravity of the supported object. By downward pressure on the hand grip or cross bar 24 of the handle, the fore end of the device may be raised off the floor, or ground, when the device and object carried by it will rest solely upon the two wheels and the device may then be handled as a truck for transporting the object.

The object is elevated, and at the same time the wheels are moved off the floor, or ground, on which they are resting by turning the handle on an arc in a clockwise direction over the rest and object resting upon it. During this operation the arms 21 of the handle will pivot on the base and lifting force will be exerted through the arms 23 and 26 to lift the rest and object upon it into an elevated position. The lift will continue until the sets of bars 11 and 12 supporting the rest are moved into a vertical position, when the arms 26 of the handle will have been moved into a position substantially in plane with the rest, and the elongated pins 25 between the arms 23 and 26 will enter the sockets 5 at the ends of the bars 4 of the rest, which engagement will limit the turning movement of the handle. The arms 23, which are substantially of the same length as the sets of arms 11 and 12, will then occupy a vertical position at the fore end of the elevated structure substantially parallel with the then vertical sets of bars 12, all substantially as shown in Figs. 2 and 3. As the handle approaches the end of its turning movement, and the arms 23 are brought down into place, the bar 24, borne by these arms, will be brought into engagement with a dog 27 on the base bar 3, first striking the bevelled edge 28 of this dog, when the dog will be lifted and then automatically fall to engage the bar 24 after this bar has attained its final position of rest, thus holding the handle in its turned position, and maintaining the elevated position of the rest and object upon it.

We claim:

1. A combination hand truck and lift comprising a base, a rest, rest supporting elements normally occupying inclined positions and pivoted, respectively, to said rest and to said base, said rest supporting elements being adapted and arranged to turn from their inclined positions when said rest is elevated, wheels secured to certain of said rest supporting elements whereby the wheels will normally occupy an operative position and be raised to occupy an inoperative position when said rest supporting elements are turned from their inclined positions as aforesaid, and means for elevating said rest and turning said rest supporting elements.

2. A combination hand truck and lift comprising a base, a rest, rest supporting elements normally occupying inclined positions and pivoted, respectively, to said rest and to said base, said rest supporting elements being adapted and arranged to turn from their inclined positions when said rest is elevated, wheels secured to certain of said rest supporting elements whereby the wheels will normally occupy an operative position and be raised to occupy an inoperative position when said rest supporting elements are turned from their inclined positions as aforesaid, and a handle having elements pivoted, respectively, to said base and to said rest whereby said rest will be elevated and said rest supporting elements be turned elevating said wheels on turning said handle with relation to said base through an arc of determinate movement.

3. A combination hand truck and lift comprising a base, a structure elevatable with relation to said base and including a rest for an object to be raised and rest supporting elements normally occupying inclined positions and pivoted, respectively, to said rest and to said base, a set of wheels, a mounting therefor elevatable with the elevation of said elevatable structure, and means for elevating said elevatable structure.

4. A combination hand truck and lift comprising a base, a structure elevatable with relation to said base and including a rest for an object to be raised and rest supporting elements normally occupying inclined positions and pivoted, respectively, to said rest and to said base, a set of wheels, a mounting therefor having link connection with said elevatable structure whereby the wheels will be elevated with the elevation of said elevatable structure, and means for elevating said elevatable structure.

5. A combination hand truck and lift comprising a base, a structure elevatable with relation to said base and including a rest for an object to be raised and rest supporting elements normally occupying inclined positions and pivoted, respectively, to said rest and to said base, a set of wheels, a mounting therefor elevatable with the elevation of said elevatable structure, and a handle having elements pivoted, respectively, to said base and to said rest whereby said rest will be elevated and said rest supporting elements be turned elevating said wheels on turning said handle with relation to said base through an arc of determinate movement.

6. A combination hand truck and lift comprising a base, a structure elevatable with relation to said base and including a rest for an object to be raised and rest supporting elements normally occupying inclined positions and pivoted, respectively, to said rest and to said base, a set of wheels, a mounting therefor having link connection with said elevatable structure whereby the wheels will be elevated with the elevation of said elevatable structure, and a handle having elements pivoted, respectively, to said base and to said rest whereby said rest will be elevated and said rest supporting elements be turned elevating said wheels on turning said handle with relation to said base through an arc of determinate movement.

7. The combination comprising a base, a structure elevatable with relation to said base and including a rest for an object to be raised and rest supporting elements normally occupying inclined positions and pivoted, respectively, to said rest and to said base, said rest supporting elements being adapted and arranged to elevate said rest when said rest supporting elements are turned from their inclined positions, and a handle having elements pivoted, respectively, to said base and to said elevatable structure, said handle being turnable over said rest and object resting thereon through an arc of determinate movement whereby the position of said elevatable structure will be changed and said rest supporting elements be turned to elevate said rest into a determined position of elevation, and means for securing said handle to said base at the end of its turning whereby said elevatable structure will be maintained in the position of its elevation.

8. The combination comprising a base, a structure elevatable with relation to the base including a rest for an object to be raised and sets of rest supporting elements pivoted, respectively, to the base and to the rest, said elements normally occupying inclined positions but adaptable and arranged to elevate the rest when the elements are turned from their inclined positions into upright positions, and a handle for controlling said elevatable structure and the position of said rest, said handle comprising an assemblage of connected parts including a set of spaced arms pivotally secured, respectively, to turn upon the base, a second set of spaced arms pivotally connecting, respectively, with the outer ends of said first named set of arms with fore and aft extensions therefrom, a set of links pivotally connecting, respectively, with the inner ends of said second set of arms and with the rest, and a cross bar forming a hand grip interposed between the outer ends of said second set of arms, said sets of arms being adaptable and arranged whereby draft will be exerted through said second set of arms and links to elevate said rest and move its supporting elements into upright position when the said set of arms pivoted to the base are turned past the rest through a determinate arc of movement.

9. The combination comprising a base, a structure elevatable with relation to the base including a rest for an object to be raised and sets of rest supporting elements pivoted, respectively, to the base and to the rest, said elements normally occupying inclined positions but adaptable and arranged to elevate the rest when the elements are turned from their inclined positions into upright positions, and a handle for controlling said elevatable structure and the position of said rest, said handle comprising an assemblage of connected parts including a set of spaced arms pivotally secured, respectively, to turn upon the base, a second set of spaced arms pivotally connecting, respectively, with the outer ends of said first named set of arms with fore and aft extensions therefrom, a set of links pivotally connecting, respectively, with the inner ends of said second set of arms and with the rest, a cross bar forming a hand grip interposed between the outer ends of said second set of arms, said sets of arms being adaptable and arranged whereby draft will be exerted through said second set of arms and links to elevate said rest and move its supporting elements into upright position, said links into position substantially parallel with the base, said second set of arms into position substantially normal to the base, and said cross bar into position adjacent the base, when said set of arms pivoted to the base are turned past the rest through a determinate arc of movement, and means interposed between the base and said cross bar for maintaining said structure in the position of its elevation.

WILLIS F. THOMPSON.
THOMAS P. CALLAHAN.